(12) United States Patent
Kornelsen et al.

(10) Patent No.: US 11,786,996 B2
(45) Date of Patent: Oct. 17, 2023

(54) AUTOMATIC SCREWDRIVING SYSTEM FOR CONNECTION OF COMPONENTS

(71) Applicant: Stöger Automation GmbH, Königsdorf (DE)

(72) Inventors: Artur Kornelsen, Wolfratshausen (DE); Lorenz Stöger, Königsdorf (DE)

(73) Assignee: STÖGER AUTOMATION GMBH, Königsdorf (DE)

( * ) Notice: Subject to any disclaimer, the term of this patent is extended or adjusted under 35 U.S.C. 154(b) by 0 days.

(21) Appl. No.: 17/591,721

(22) Filed: Feb. 3, 2022

(65) Prior Publication Data
US 2022/0258292 A1 Aug. 18, 2022

(30) Foreign Application Priority Data

Feb. 15, 2021 (DE) .................. 10 2021 103 466.3
Oct. 7, 2021 (DE) .................. 10 2021 126 022.1

(51) Int. Cl.
*B23P 19/00* (2006.01)
*B23P 19/06* (2006.01)
(Continued)

(52) U.S. Cl.
CPC ........... *B23P 19/006* (2013.01); *B23P 19/001* (2013.01); *B23P 19/06* (2013.01); *B25J 9/0009* (2013.01);
(Continued)

(58) Field of Classification Search
CPC ....... B23P 19/006; B23P 19/06; B23P 19/001; B25J 9/0009; B25J 11/005; B25J 11/00;
(Continued)

(56) References Cited

U.S. PATENT DOCUMENTS 10,010,928 B2 * 7/2018 Zinn .................. B23K 20/16
10,981,213 B2 * 4/2021 Stützer .................. B21J 5/066
(Continued)

FOREIGN PATENT DOCUMENTS

DE  102017100692 A1  7/2017
DE  202016103143 U1  9/2017
(Continued)

OTHER PUBLICATIONS

European Seach Report dated Jul. 25, 2022 for European Patent Application No. EP22152633.

*Primary Examiner* — Ryan J. Walters
(74) *Attorney, Agent, or Firm* — Greer, Burns & Crain, Ltd.

(57) ABSTRACT

The screwdriving system for connection of components that require high contact pressures for their screw connection, having a screwdriving unit which is connected to an articulated robot, wherein the screwdriving unit contains a motor for the rotary drive, an actuator for the linear drive, a gear mechanism, a torque shaft, a tool holder for a screwdriving tool and a feed head which is supplied with screws, which are held in the feed head during the screwing-in operation, the tool holder, the screwdriving tool and the feed head being arranged on a common screw axis, includes an articulated bearing arrangement, the pivoting of which is able to compensate for a deflection of a robot axis of the articulated robot caused by contact pressures and for a tilted position of the screwdriving unit resulting therefrom.

15 Claims, 11 Drawing Sheets

(51) Int. Cl.
  *B25J 9/00*   (2006.01)
  *B25J 11/00*  (2006.01)
  *B25J 15/00*  (2006.01)
  *B25J 9/10*   (2006.01)
  *B25J 17/02*  (2006.01)

(52) U.S. Cl.
  CPC ............... *B25J 9/108* (2013.01); *B25J 11/00* (2013.01); *B25J 11/005* (2013.01); *B25J 15/00* (2013.01); *B25J 15/0019* (2013.01); *B25J 17/0241* (2013.01)

(58) Field of Classification Search
  CPC ........ B25J 15/00; B25J 9/108; B25J 15/0019; B25J 17/0241
  See application file for complete search history.

(56) References Cited

U.S. PATENT DOCUMENTS

2017/0205798 A1    7/2017  Ishii
2018/0200780 A1 *  7/2018  Stützer .................... B21J 5/066

FOREIGN PATENT DOCUMENTS

| DE | 102018117268 A1 | 1/2020 | |
| EP | 3 782 773 A1 | 2/2021 | |
| JP | S59227335 A * | 12/1984 | ............ B23P 19/004 |
| JP | S62282833 A | 12/1987 | |
| JP | H08309626 A | 11/1996 | |

* cited by examiner

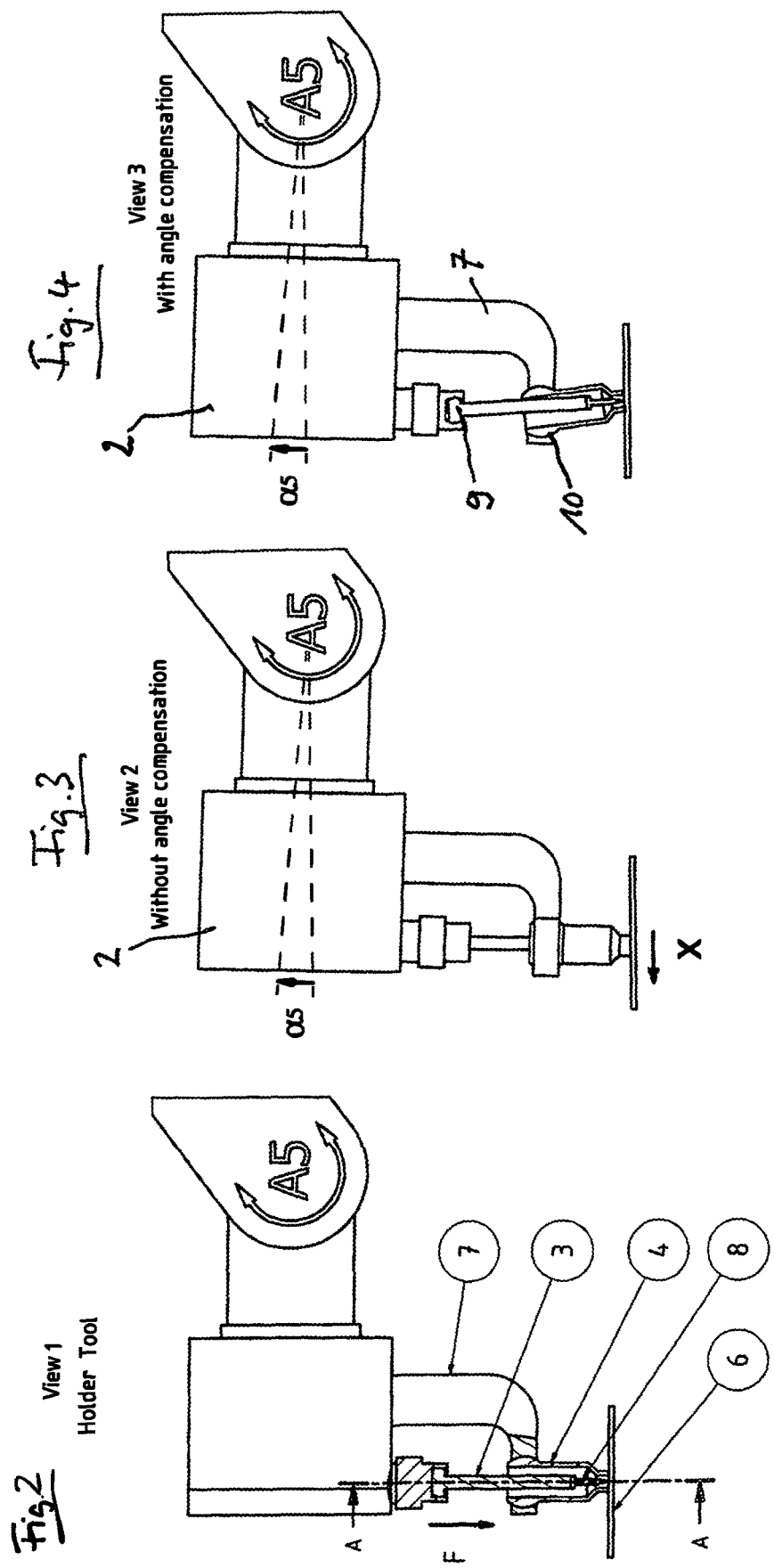

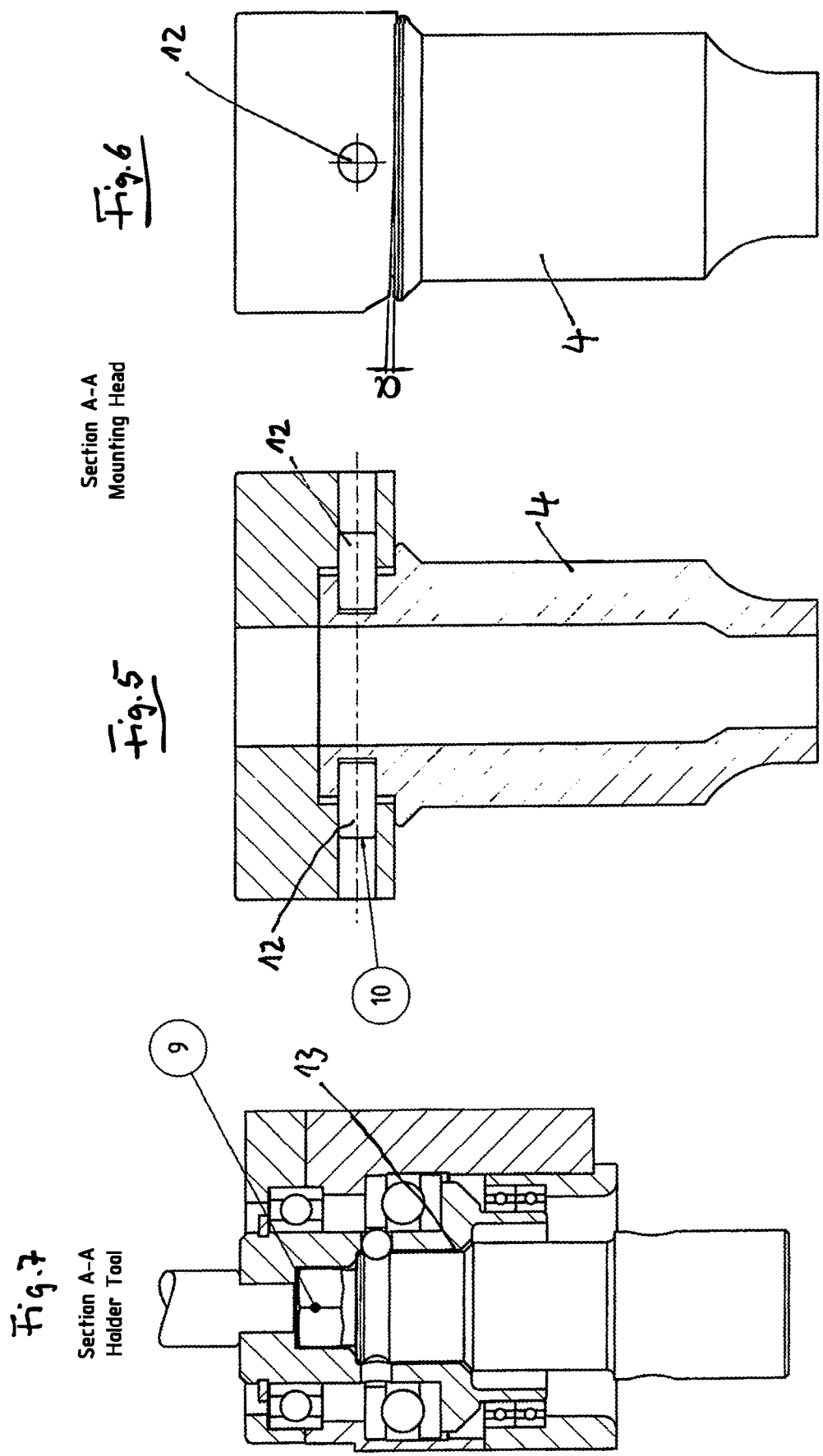

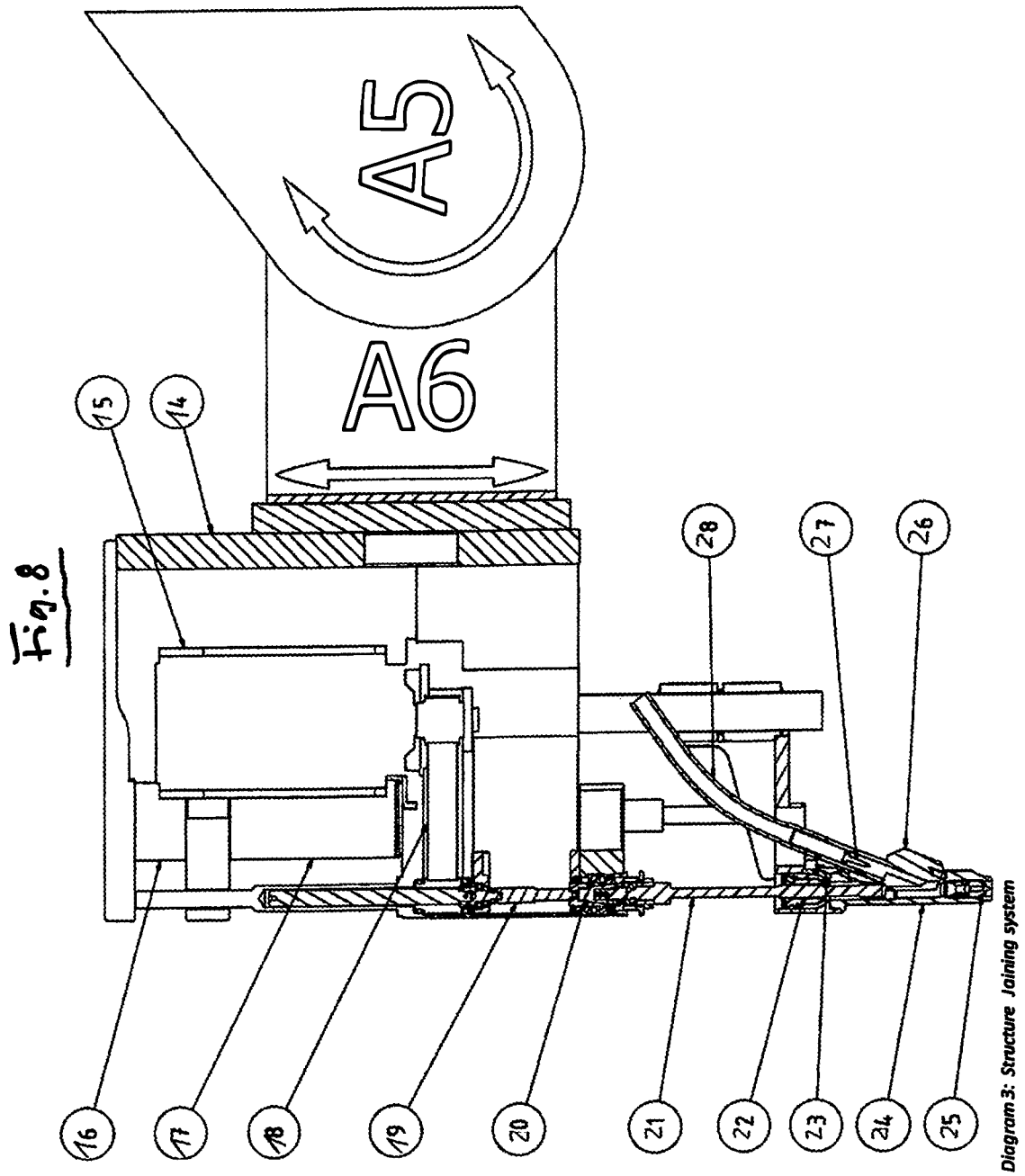

Fig. 9
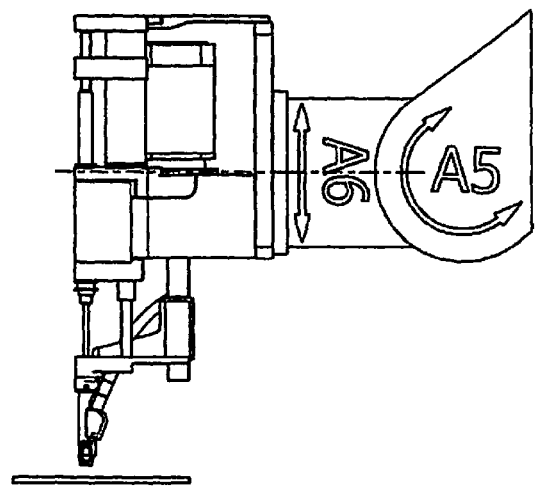
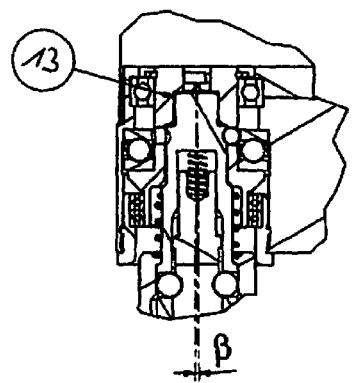
DETAIL D
Bearing Tool receiver
Diagram 4: Sequence Joining process

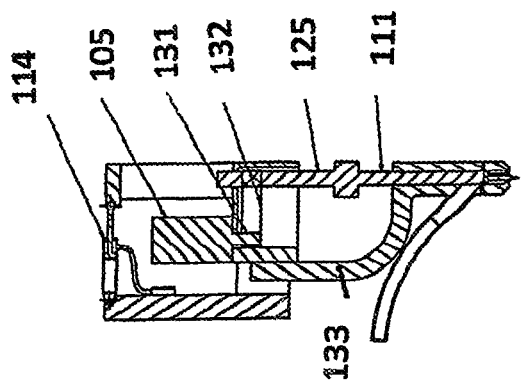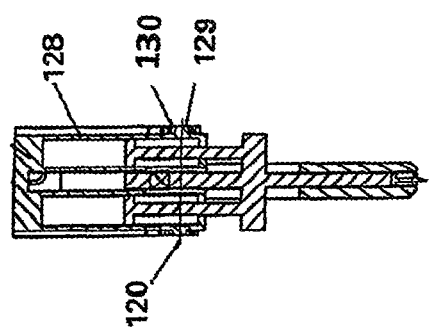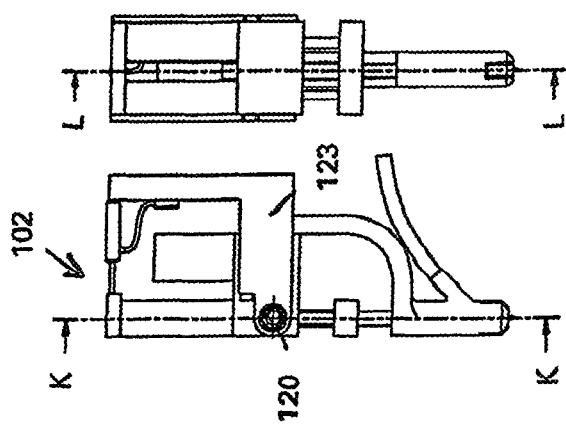

AUTOMATIC SCREWDRIVING SYSTEM FOR CONNECTION OF COMPONENTS

PRIORITY CLAIM

The subject application claims convention priority to German patent application No. 10 2021 103 466.3, filed Feb. 15, 2021 and German patent application No. 10 2021 126 022.1, filed Oct. 7, 2021.

FIELD OF THE INVENTION

The invention relates to an automatic screwdriving system for connection of components that require high contact pressures for their screw connection.

BACKGROUND

In an automatic screwdriving system, a screwdriving unit is mounted on an articulated robot. The screwdriving unit contains a motor for the rotary drive, an actuator for the linear drive, a gear mechanism, a torque shaft, a tool holder for a screwdriving tool and a feed head which is automatically supplied with screws, preferably flow-drilling screws, which are held in centering jaws of the feed head during the screwdriving operation. In the case of self-tapping screws, for which there is no drilled hole, the contact pressures of the screwdriving tool are high, being, for example, about 3000 N. The tool holder, the screwdriving tool and the feed head are located on a common screw axis.

In the case of automatic screwdriving systems of this kind, as a result of the high contact pressures exerted on the screws by the screwdriving tool the articulated robot absorbs high forces which can lead to a deflection of the robot axes, resulting in a deflection and slight tilting of the screwdriving unit. In the case of the screwdriving systems known hitherto, such deflection brings about a misalignment of the feed head of the screwdriving unit in which the screw being processed is held, giving rise to high transverse forces and bending stresses which result in the screw being screwed in at a slight angle. During final tightening of the screw it can happen that the screw head does not lie flat against the component and accordingly a small gap is formed. In addition, the torque value of the screw connection can be distorted and the screwdriver can be subject to increased wear.

The problem underlying the present invention is to avoid such disadvantages of the automatic screwdriving systems known hitherto and to define an improved system which ensures that, even in the event of high contact pressures during the screwdriving operation, the screws are screwed in without tilting and without a gap being formed between the screw and the component at the end of the screwdriving operation.

That problem is addressed according to the present invention. Advantageous configurations of the invention are characterised in the claims.

SUMMARY OF THE INVENTION

The invention provides an articulated bearing arrangement, the pivoting of which is able to compensate for a deflection of a robot axis of the articulated robot caused by contact pressures and for a tilted position of the screwdriving unit resulting therefrom. The articulated bearing arrangement has the effect that the feed head of the screwdriving unit is held at a right-angle with respect to the plane of the component into which the screw is being screwed during the entire screwdriving operation. By virtue of the articulated bearing arrangement, the screwdriving tool, which is in engagement with the engagement feature of the screw during the screwdriving operation, also remains in a substantially vertical position, so that the screwdriving operation can take place without transverse forces.

An embodiment of the invention according to the invention provides that, as articulated bearing arrangement, the tool holder of the screwdriving tool and the feed head are pivotally mounted about joints. Accordingly, two additional joints are integrated into the screwdriving unit, by means of which the feed head and the screwdriving tool are deflectable during the screwdriving operation.

By virtue of the articulated mounting of the feed head, the feed head lies flat on the workpiece during the entire screwdriving operation, although the screwdriving unit is moved into a tilted position by the robot as a result of a deflection of the robot axes. The screws are therefore held by the feed head, during the entire screwdriving operation, at a right-angle with respect to the plane of the component into which the screw is being screwed. By virtue of the articulated mounting of the tool holder with the screwdriving tool, the screwdriving tool, which is in engagement with the engagement feature of the screw during the screwdriving operation, also remains in a substantially vertical position, because the screwdriving tool has play in its guide and is able to follow the screw centrally, without the development of transverse forces which could cause friction.

Accordingly, the screw is screwed in straight, that is to say at a right-angle with respect to the component, without a gap being formed between the screw and the component. The screw connection is effected with a correct torque value, and increased wear on the screwdriving unit is avoided.

An advantageous configuration of the embodiment according to the invention provides that at the upper end of the tool holder there is arranged a spherical hexagonal head by means of which the tool holder is deflectable through an angle β. Instead of the spherical hexagonal head it is also possible for the tool holder to be provided with some other element which allows a small pivoting movement of the tool holder.

Furthermore, it is advantageously proposed that the feed head be deflectable through an angle γ by two coaxial bearing pins. In the case of this joint too, it is possible to use other means that allow a small deflection of the feed head.

The slightly tilted position of the screwdriving unit caused by the large load on the robot axes of the articulated robot is accordingly compensated by a deflection of the tool holder with the screwdriving tool and the deflection of the feed head, so that during the screwdriving operation the feed head lies flat on the component and the screw and the screwdriving tool are held at substantially a right-angle with respect to the component.

In accordance with a further proposal of the invention, the screwdriving tool can be provided with two tapered portions on which the screwdriving tool moves out of the tool guide in the feed head during the screwdriving operation.

In addition, it is advantageously proposed that the deflections of the tool holder and the feed head take place against the force of springs which restore the deflections again when the screwdriving operation is complete.

An alternative embodiment of the invention provides, as articulated bearing arrangement, that the screwdriving unit is pivotally or rotatably mounted about a joint which is arranged in the screw axis, so that a deflection of a robot axis of the articulated robot caused by contact pressures and a tilted position of the screwdriving unit resulting therefrom can be compensated by pivoting of the screwdriving unit, so that the screw axis maintains its perpendicular position with respect to the plane of the workpieces being connected. By virtue of such articulated mounting of the screwdriving unit, the feed head lies flat on the workpiece, for example a metal sheet, during the entire screwdriving operation, while the screwdriving unit is pivoted about the joint located in the screw axis in such a way that the screw axis maintains its perpendicular position with respect to the plane of the workpieces being connected. The plane of the components being connected can be arranged so as to be horizontal or at an angle to the horizontal.

It is especially advantageously also proposed that in this embodiment of the invention an adapter plate be attached to the free arm of the articulated robot, on which adapter plate there are mounted two mutually spaced side panels or holding arms, between which the screwdriving unit is attached by means of the joint. Furthermore, between the adapter plate and the screwdriving unit, preferably the cylinder thereof for the linear drive, there is arranged a reset cylinder unit which co-operates with a fixed stop in order to fix the non-deflected starting position of the screwdriving unit and its screw axis until the screwdriving operation is initiated. The fixed stop can be formed on at least one of the side panels against which the cylinder of the actuator for the linear drive is drawn by the reset cylinder unit in order to fix the non-deflected starting position of the screwdriving unit. On deactivation of the reset cylinder, the screwdriving unit is free to pivot.

The piston/cylinder unit of the reset cylinder can advantageously be pneumatically operated, more specifically by means of a valve arranged in the compressed air supply line.

The joint for the angle compensation can advantageously be formed by mounting two bolts on the opposite side walls of the cylinder for the linear drive, which bolts both engage in ball bearings in the two side panels. As a result, the entire screwdriving unit is pivotable about the joint.

The joining operation, in which the workpiece into which a screw is to be introduced can be firmly clamped, proceeds as follows:

1. The reset cylinder is actuated so that a component of the screwdriving unit, preferably the cylinder for the linear drive/tool stroke, is in contact with the fixed stop.
2. The screwdriving unit is positioned with the feed head on the workpiece.
3. The reset cylinder is deactivated (evacuated) by means of the valve.
4. The screwdriving tool moves to the screw, which is located in the feed head, and is then subjected to high axial force.
5. As a result of the high processing force, the robot axis is deflected through an angle α5.
6. The deflection of the robot axis is compensated by the joint in the screw axis.
7. The screwdriving operation is performed, during which no transverse forces act on the screw and the component. As a result,
    a) damage caused by "sliding" of the feed head on the workpiece is avoided;
    b) the torque during the screwdriving operation is not "distorted", with the result that process reliability is increased;
    c) the screw and the screwdriving tool are subject to less load, with the result that service life is increased;
    d) the screw is screwed in straight, with the result that the tightness of the screw connection is improved.
8. Once the screw has been screwed in, the axial force of the screwdriving tool is withdrawn and the robot returns to its starting position.
9. The reset cylinder is activated (pressurised) again and the cylinder of the actuator for the linear drive makes contact with the fixed stop again.
10. The actuator for the linear drive is reset and the screwdriving unit lifts away from the workpiece.

Further features and details of the invention will be found in the following description of preferred embodiments of the screwdriving system and with reference to the drawings.

BRIEF DESCRIPTION OF THE DRAWINGS

FIG. 2 shows a partial section view of a screwdriving unit;

FIG. 3 shows a side view of the screwdriving unit of FIG. 2 without angle compensation;

FIG. 4 shows a side view of the screwdriving unit with angle compensation;

FIG. 5 shows a longitudinal section view through the region of the joint of the feed head;

FIG. 6 shows a side view of a portion of the region of FIG. 5;

FIG. 7 shows a longitudinal section view through the region of the upper joint;

FIG. 8 shows a vertical section view through the first embodiment of the screw-driving unit according to the invention;

FIG. 9 shows the joint in the tool holder (detail D);

FIG. 16 shows a side and front view of the screwdriving unit;

FIG. 17 shows a section K-K through the side view of FIG. 16;

FIG. 18 shows a section L-L through the front view of FIG. 16;

DETAILED DESCRIPTION OF THE INVENTION

Figure 1:
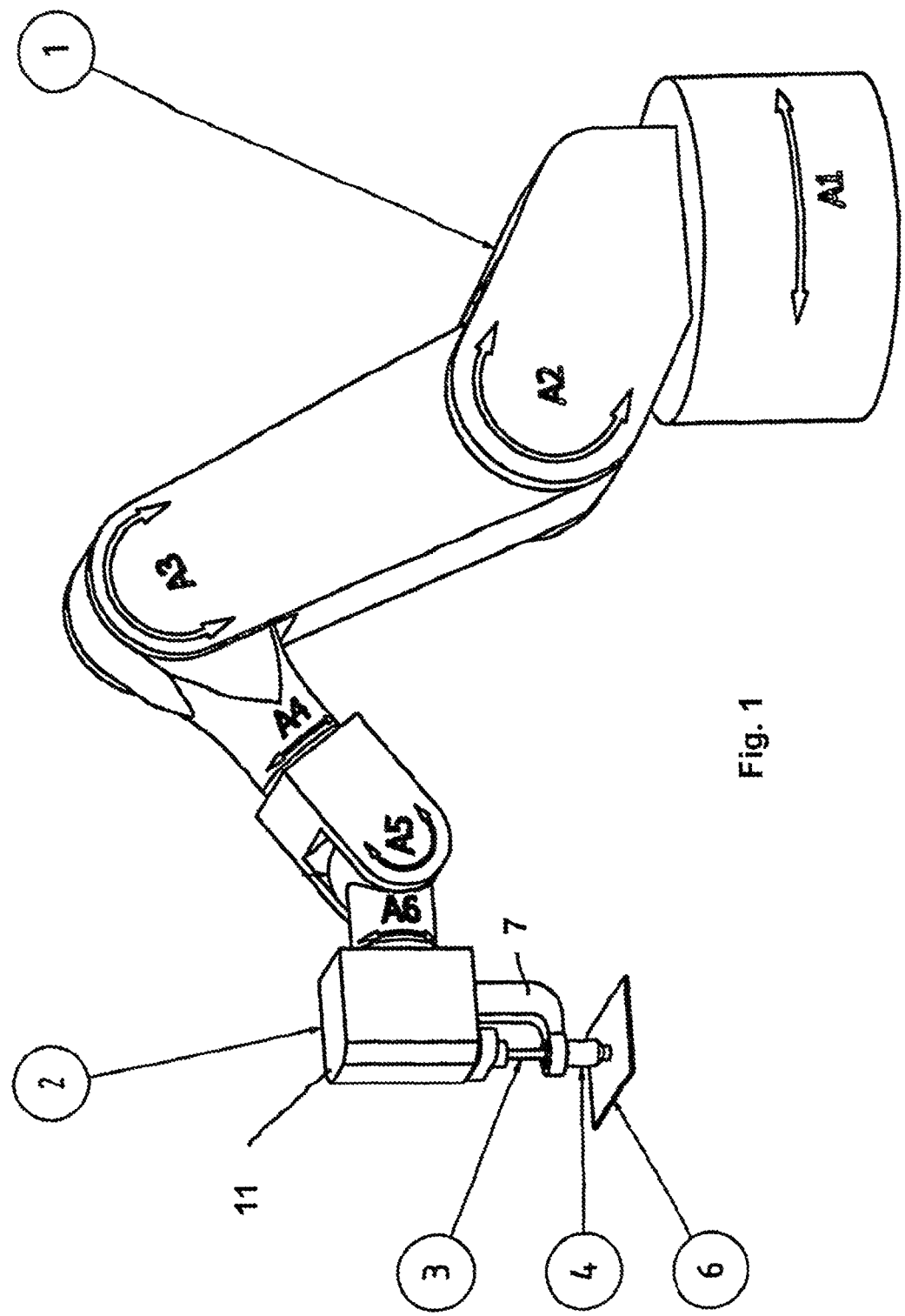
FIG. 1 shows a perspective view of a first embodiment of the screwdriving system according to the invention.

FIG. 1 shows a first embodiment of the screwdriving system according to the invention for connection of components. The screwdriving system contains an articulated robot 1, the arms A1 to A6 of which are rotatable in the direction of the arrows shown. A screwdriving unit 2 is attached to the front arm A6, in the housing of which screwdriving unit there is arranged a drive device for a screwdriving tool 3. A holding device 7 is attached to the housing 11, on the free end of which holding device there is mounted a feed head 4 which is supplied with screws one after the other through a hose (not shown), which screws are screwed into a component 6. During the screwdriving operation the screws are held in the feed head 4 so that their longitudinal axis coincides with the centre longitudinal axis of the feed head 4.

In the case of a joining operation using flowdrilling screws, high contact pressures are required which can bring about a deflection of the robot axes in the articulated robot 1. In the embodiment shown, this applies to the axis A5. This deflection results, in turn, in a misalignment of the feed head 4 in which the screw being processed is held. Since the components 6 to be joined are firmly fixed during processing, this deflection cannot be compensated without special technical measures. In the embodiment shown, for example, high transverse forces and bending stresses develop in the screwdriving unit and in the join location, which forces have an adverse effect on the outcome of the screwing operation. This results inter alia in a tilted position of the screw, a distorted torque value during the screwdriving operation and increased wear on the screwdriving tool.

FIG. 2 shows, in a similar diagrammatic view, the screwdriving unit 2 attached to the articulated robot, with the feed head 4 being shown in section. The screwdriving tool 3 is in engagement with a screw 8 which is held in a vertical position in the feed head 4. During the screwdriving operation a significant contact pressure F is exerted on the screw 8.

As a result of that contact pressure, the screwdriving unit 2 is pivoted through an angle α5 in the direction of the arrow, with the result that, at the join location, a force X is produced which, in the absence of means for angle compensation, results in a slightly tilted position of the screw during screwing-in.

In order that such a faulty screwdriving operation can be avoided, two additional joints are integrated into the screwdriving unit 2 by means of which the deflection of the robot can be compensated. The joint above the screwdriving tool 3 is preferably a spherical hexagon 9 which allows a pivoting movement of the tool 3, as shown in the diagrammatic FIG. 4. Furthermore, the feed head 4 is articulatedly attached to the holding device 7; this joint 10 consists of two coaxial, spring-loaded cylindrical pins 12, as shown purely diagrammatically in FIG. 5. By virtue of that articulated mounting of the mouthpiece 4, the mouthpiece can be pivoted through an angle α, as shown in FIG. 6, so that in the event of a tilted position of the screwdriving unit 2, the feed head 4 can be positioned flat on the component during the entire screwdriving operation and the screw is screwed in perpendicular to the component.

FIG. 7 shows a section A-A through the tool holder 13 of the screwdriving tool 3. At the upper end, a spherical hexagonal head 9 is held in such a way that the screwdriving tool 3, which is in engagement with a screw, is pivoted so that, during the screwdriving operation, it is able follow the screw without the development of transverse forces. During the screwdriving operation, the screwdriving tool has give in the two joints 9, 10, so that the transverse forces are eliminated and the quality of the screwdriving operation is considerably improved.

FIG. 8 shows a vertical section through an embodiment of a screwdriving unit according to the invention which is attached to an articulated robot by an adapter plate 14. The essential components of the screwdriving unit will be found in the following list which indicates the associated reference numerals in FIG. 8:

14 adapter plate
15 motor
16 actuator feed stroke
17 actuator tool stroke
18 reversing gear mechanism
19 torque shaft
20 tool holder
21 tool
22 tool guide
23 restoring spring
24 feed head
centering jaw
26 feed arm
27 connecting element
28 feed hose The process sequence of the screwdriving system shown is as follows:

The screw is supplied via the feed hose 28, for example by compressed air, and held in the centering jaws 25, which are held together by means of a tension spring or a pneumatic cylinder. Alternatively, the screws can be also supplied by "pick and place" or by means of a magazine integrated into the system.

Once the screwdriving tool has engaged in the engagement feature of the screw and the feed head has been positioned on the component, the processing force (F) is initiated, the robot axis being deflected by an angle α.

In the tool holder 13 the deflection a of the axis 6 is compensated by the angle β with the aid of a spherical hexagonal head and in the feed head 4 by the angle γ with the aid of two bearing pins 12. The tool 3 is provided with two tapered portions. As soon as the screw 8 penetrates the component 6, the screwdriving tool 3 moves out of the tool guide 22 in the feed head, as can be seen from DETAIL G. Bending stress and friction on the screwdriving tool 3 are thus eliminated.

As soon as the screwdriving operation is complete, the feed stroke 16 and the tool stroke 17 are reset and the feed head lifts away from the component, the feed head being pressed into the starting position again by restoring springs, and the next screw can be supplied.

Figure 10:
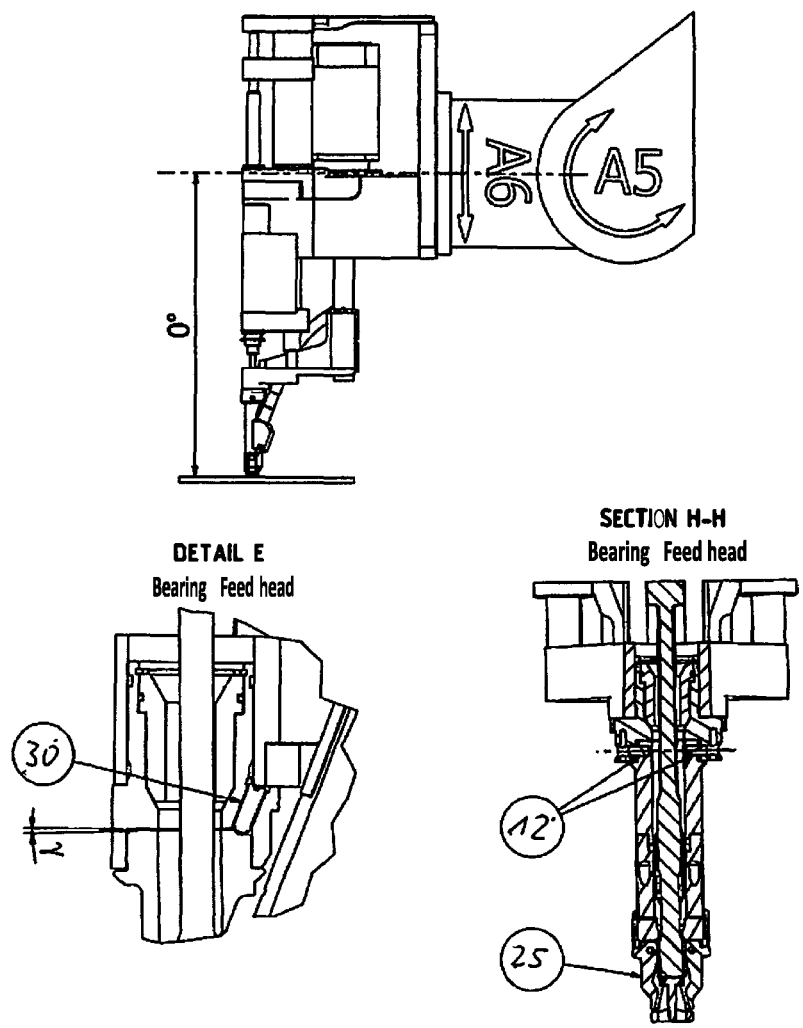
FIG. 10 shows the joint in the feed head (detail E and section H-H)

In order to compensate for the deflection in the robot axis, two additional joints are integrated into the screwdriving unit. FIG. 9 shows the joint 9 in the tool holder 13 as DETAIL D. This joint consists of a preferably spherical hexagonal head 9. The joint in the feed head is shown in FIG. 10 as DETAIL E and SECTION H-H and contains two bearing pins 12 about which the feed head 4 is pivotable through an angle γ. Reference numeral 25 denotes the centering jaws of the feed head, and reference numeral 30 denotes a restoring spring which returns the feed head to the starting position again when the screwdriving operation is complete.

During the screwdriving operation, the screwdriving unit is able to give in those two joints. As a result, the transverse forces are eliminated and the tool remains at virtually a right-angle with respect to the component, with the result that the quality of the join is considerably improved.

Figure 11:
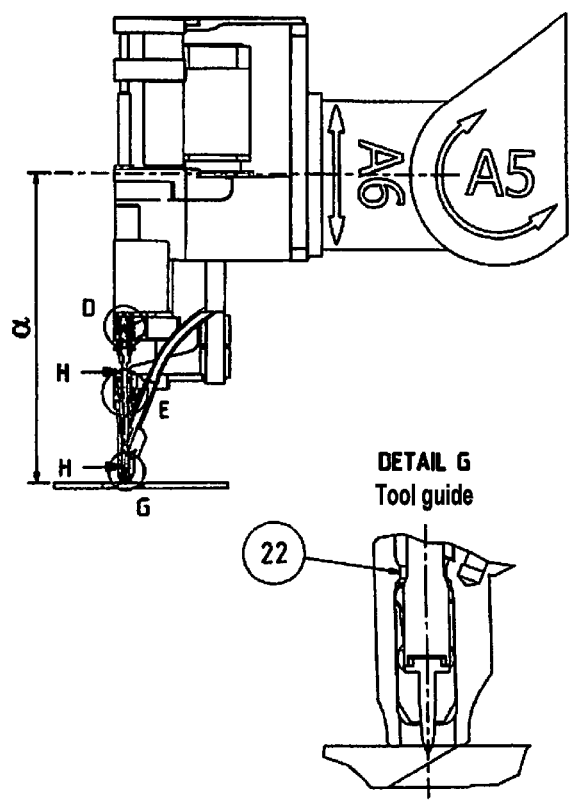
FIG. 11 shows the tool guide (detail G)

FIG. 11 shows the guide 22 of the screwdriving tool, which is provided with two tapered portions. As soon as the screw penetrates the component, the screwdriving tool moves out of the tool guide 22, with the result that bending stress and friction on the tool are eliminated.

Figure 12:
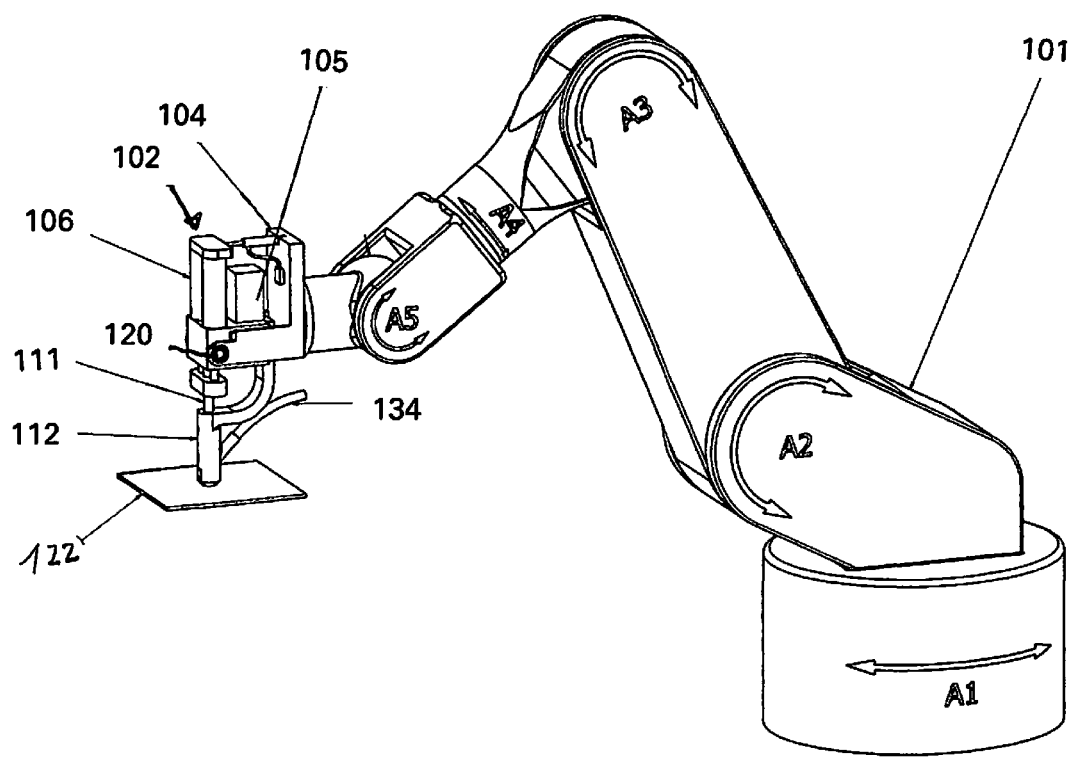
FIG. 12 shows a perspective view of a second embodiment of the automatic screwdriving system.
Figure 19:
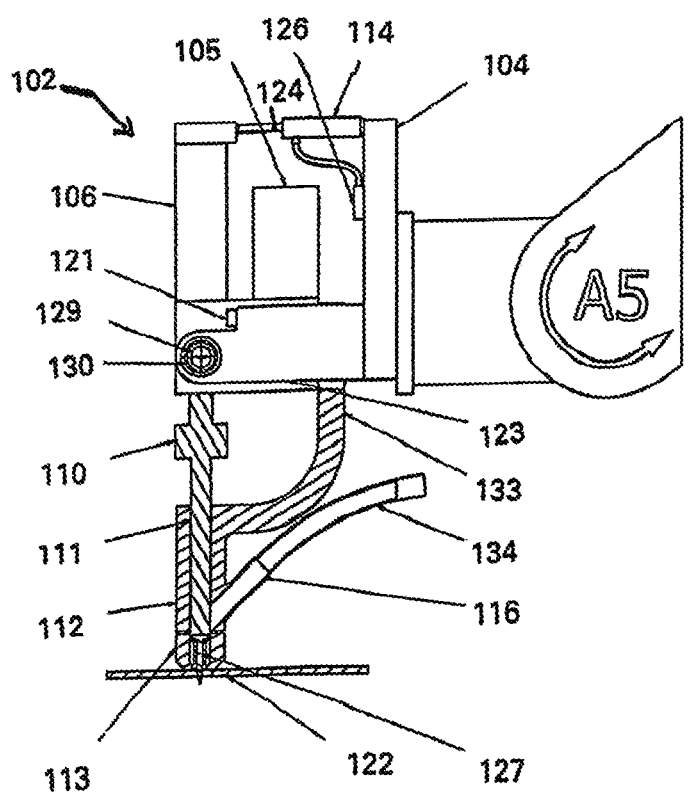
FIG. 19 shows the structure of the second embodiment of the screwdriving system.

FIGS. 12 and 19 show a second embodiment of the screwdriving system according to the invention for connection of components. The screwdriving system contains an articulated robot 101, the arms A1 to A5 of which are rotatable in the direction of the arrows shown. An adapter plate 104 is connected to the front robot axis, on the lower end region of which adapter plate there are mounted two side panels 123 which are spaced apart from one another in parallel. Between those side panels 123, a screwdriving unit 102 is pivotally mounted about a joint 120. The screwdriving unit contains a motor 105 for the rotary drive, a linear actuator 106, a tool holder 110 for a screwdriving tool 111, a feed head 112 having centering jaws 113. The connection elements, i.e. screws, to be screwed in are supplied to the feed head 112 through a feed arm 116.

On the upper end region of the adapter plate 104 there is mounted a reset cylinder 114, the piston rod 124 of which is fixedly connected to the linear actuator 106. Compressed air for acting upon the reset cylinder 114 is fed through a line in which a valve 126 is installed. On the side panels 123 there is formed a fixed stop 121 against which the linear actuator 106 is drawn in the non-pivoted starting position of the screwdriving unit 102. The torque shaft 125 operated by the motor 105, the tool holder 110, the screwdriving tool 111 and the feed head 112 having the centering jaws 113 lie on a common screw axis which runs perpendicular to the plane of the workpiece 122. The joint 120 likewise lies in the screw axis. During the screwdriving operation the screws 127 are held in the centering jaws 113 so that their longitudinal axis coincides with the centre longitudinal axis of the feed head 112.

Figure 13:
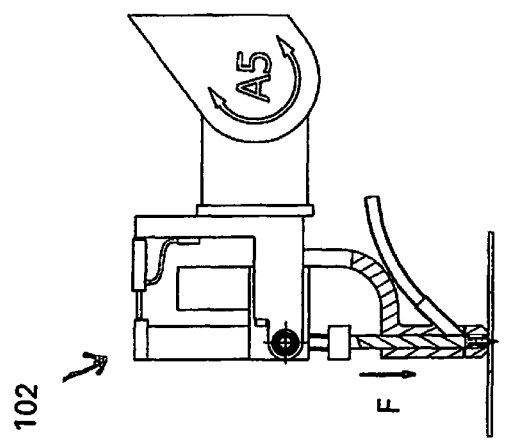
FIG. 13 shows the screwdriving unit in the initial position.

FIG. 13 shows, in a similar diagrammatic view, the screwdriving unit 102 attached to the articulated robot, with the feed head 112 with the centering jaws 113 being shown in section. The screwdriving tool 111 is in engagement with a screw which is held in a vertical position in the centering jaws 113. During the screwdriving operation a significant contact pressure F is exerted on the screw.

Figure 14:
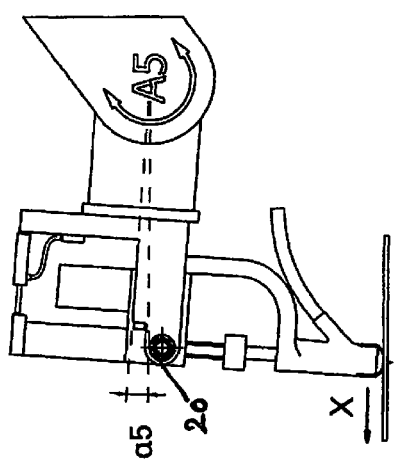
FIG. 14 shows the screwdriving unit of FIG. 13 during the screwdriving process without angle compensation.

As a result of that contact pressure, the screwdriving unit 102 is pivoted through an angle α5 in the direction of the arrow, with the result that, at the join location, a force X is produced which, in the absence of means for angle compensation, would result in a slightly tilted position of the screw during screwing-in (FIG. 14).

Figure 15:
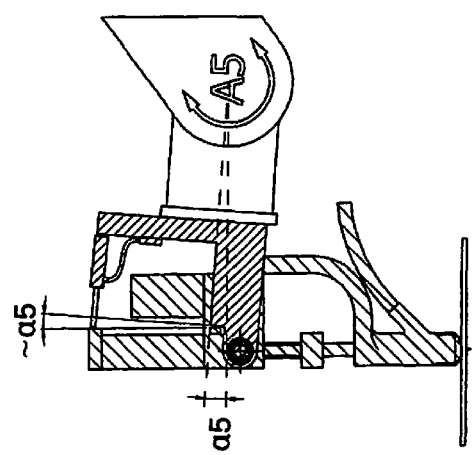
FIG. 15 shows a section view of the screwdriving unit with angle compensation.

In order that such a faulty screwdriving operation can be avoided, the screwdriving unit 102 is connected by a joint 120 to the side panels 123, which are attached to the adapter plate 104 so as to be resistant to bending, which joint 120 lies on the screw axis of the screwdriving unit 102. Once the reset cylinder 114 has been deactivated, i.e. depressurised, the screwdriving unit 102, the centering jaws 113 of which are pressed firmly against the metal sheet 122 and the screw of which is subject to high axial force, is pivoted about the joint 120 so that the screw axis maintains its perpendicular position with respect to the plane of the metal sheet 122. That angle compensation is shown diagrammatically in FIG. 15.

FIG. 16 shows a side view and a front view of the screwdriving unit 102 articulated on the side panels 123. The cylinder 128 of the linear actuator 106 is provided with a bolt 129 on each of its opposite outer sides, which bolts are seated in ball bearings 130 arranged in the side panels 123. This is shown in greater detail in FIG. 17 which shows section K-K in FIG. 16.

FIG. 18 shows a section L-L of FIG. 16, which shows the relative positions of the motor 105, its drive shaft 131, the gear mechanism 132 and the torque shaft 125 with the screwdriving tool 111. In addition, the Figure also shows a holding device 133 for the feed head 112.

FIG. 19 shows the overall structure of the second embodiment of the screwdriving system, in which the screws are supplied one after the other through a feed hose 134 and the afore-mentioned feed arm 116 to the centering jaws, which are held together by means of a tension spring or a pneumatic cylinder. Alternatively, the screws can be also supplied by "pick and place" or by means of a magazine integrated into the system.

The invention claimed is:

1. A screwdriving system for connection of components that require high contact pressures for their screw connection, the screwdriving system having a screwdriving unit which is connected to an articulated robot, wherein the screwdriving unit contains a motor for a rotary drive, an actuator for a linear drive, a gear mechanism, a torque shaft, a tool holder for a screwdriving tool and a feed head which is supplied with screws which are held in the feed head during the screwing-in operation, the tool holder, the screwdriving tool and the feed head being arranged on a common screw axis, the screwdriving system comprising:
an articulated bearing arrangement, the pivoting of which is able to compensate for a deflection of a robot axis of the articulated robot caused by contact pressures and for a tilted position of the screwdriving unit resulting therefrom.

2. The screwdriving system according to claim 1, wherein the screws are flow drilling screws.

3. The screwdriving system according to claim 1, wherein in the articulated bearing arrangement, the tool holder of the screwdriving tool and the feed head are pivotally mounted about joints which are operative in such a way that the deflection of the robot axis of the articulated robot caused by the contact pressures and the tilted position of the screwdriving unit resulting therefrom can be compensated by pivoting of the tool holder with the screwdriving tool and of the feed head, so that they maintain their perpendicular position with respect to the plane of the parts being connected.

4. The screwdriving system according to claim 1, wherein at an upper end of the tool holder there is arranged a spherical hexagonal head by means of which the tool holder is deflectable through an angle (β).

5. The screwdriving system according to claim 1, wherein the feed head is deflectable through an angle (γ) by two coaxial bearing pins.

6. The screwdriving system according to claim 1, wherein the deflection (α) of the screwdriving unit can be compensated by a deflection (β) of the tool holder and deflection (γ) of the feed head, so that during the screwdriving operation the feed head lies flat on the component and the screw and the screwdriving tool are held at substantially a right-angle with respect to the component.

7. The screwdriving system according to claim 6, wherein the deflections of the tool holder and the feed head can be restored by force of springs.

8. The screwdriving system according to claim 1, wherein the screwdriving tool is provided with two tapered portions on which the screwdriving tool moves out of a tool guide in the feed head during the screwdriving operation, so that bending stress and friction on the screwdriving tool are eliminated.

9. The screwdriving system according to claim 1, wherein in the articulated bearing arrangement, the screwdriving unit is pivotally mounted about a joint which is arranged in the screw axis and is operative in such a way that the deflection of a robot axis of the articulated robot caused by contact pressures and the tilted position of the screwdriving unit resulting therefrom can be compensated by pivoting of the screwdriving unit, so that the screw axis maintains its perpendicular position with respect to the plane of the components being connected.

10. The screwdriving system according to claim 9, wherein an adapter plate is attached to a free arm of the articulated robot, on which the adapter plate there are mounted two mutually spaced side panels, between which the screwdriving unit is attached by means of the joint.

11. The screwdriving system according to claim 10, wherein between the adapter plate and the screwdriving unit there is arranged a reset cylinder which is able to co-operate with a fixed stop on at least one of a plurality of side panels to fix a non-deflected starting position of the screwdriving unit and its screw axis.

12. The screwdriving system according to claim 11, wherein the reset cylinder is mounted on the adapter plate and on the cylinder of the linear drive, and the fixed stop fixes the non-deflected starting position of the cylinder of the linear drive when the cylinder is drawn against the fixed stop.

13. The screwdriving system according to claim 11, wherein when the reset cylinder is deactivated, the screwdriving unit is pivotable about the joint.

14. The screwdriving system according to claim 11, wherein the reset cylinder is provided with a valve for pneumatic operation.

15. The screwdriving system according to claim 11, wherein a bolt projects from each of opposite outer sides of the reset cylinder of the linear drive, and the bolts engage in ball bearings provided in the side panels, with the result that the screwdriving unit is articulatedly mounted.

* * * * *